Aug. 8, 1950 M. A. MIERAS ET AL 2,518,356
HEATER STRUCTURE
Filed May 19, 1947 3 Sheets-Sheet 1
FIG.1.
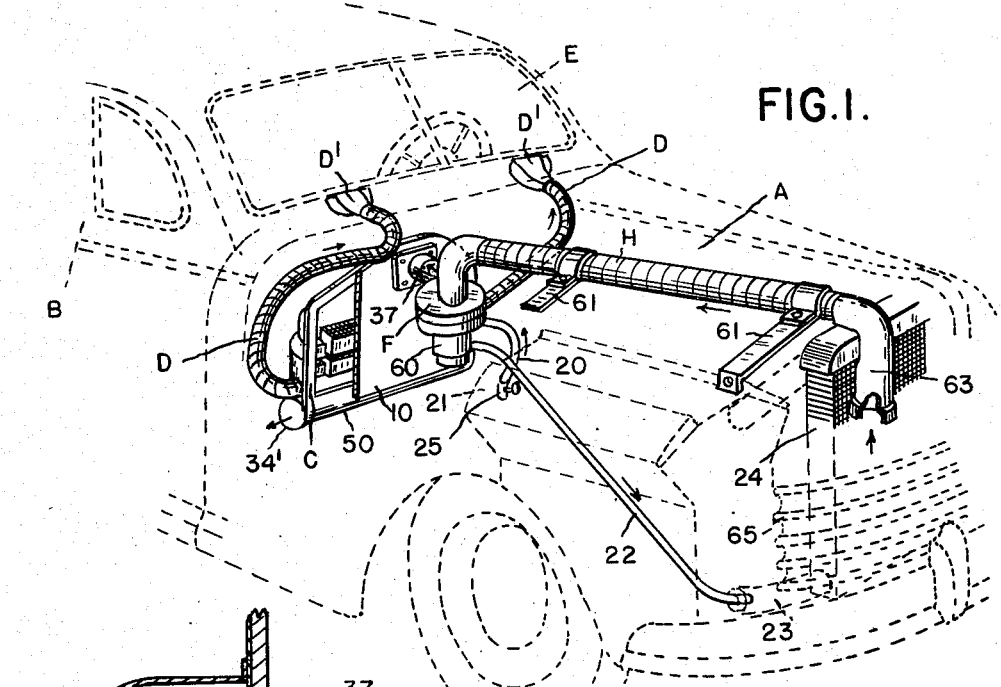
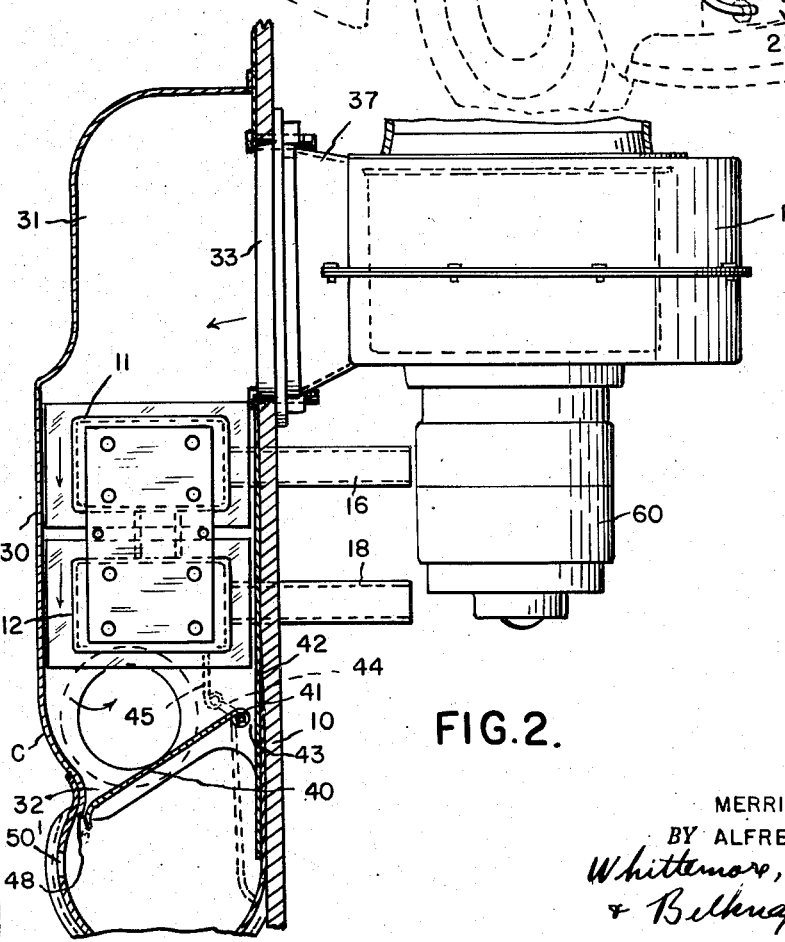
FIG.2.
INVENTORS
MERRITT A. MIERAS
BY ALFRED F. MILLINGTON
Whittemore, Hulbert
& Belknap ATTORNEYS Aug. 8, 1950     M. A. MIERAS ET AL     2,518,356
HEATER STRUCTURE Filed May 19, 1947     3 Sheets-Sheet 3

INVENTORS
MERRITT A. MIERAS
BY ALFRED F. MILLINGTON
Whittemore, Hulbert
& Belknap ATTORNEYS Patented Aug. 8, 1950

2,518,356

UNITED STATES PATENT OFFICE 2,518,356

HEATER STRUCTURE

Merritt A. Mieras, Detroit, and Alfred F. Millington, Northville, Mich., assignors to Novi Equipment Company, Novi, Mich., a corporation of Michigan Application May 19, 1947, Serial No. 749,104

9 Claims. (Cl. 257—137)

This invention relates generally to vehicle heater structures and refers more particularly to hot water heaters for motor vehicles.

One of the essential objects of the invention is to provide a heater structure wherein a casing for the hot water core is provided at each end thereof with two outlets for the air that has been heated by the core. One outlet at each end openly discharges endwise from the casing into the interior of the vehicle while the other outlet at each end is connected to a supply conduit for a defroster for the windshield of the vehicle. Inasmuch as the heated air is discharged from opposite ends of the casing, the flow or distribution thereof will be initially toward opposite sides of the passenger compartment of the motor vehicle and thence rearwardly along said opposite sides of the passenger compartment to the rear thereof. Thus the flow of heated air directly toward or against the occupants of the front seat is avoided; cold air drafts from the doors are eliminated; and the distribution is generally better. When such heater structure is installed in a two door or four door sedan type of automobile, the heated air discharged from the ends of the casing will also flow rearwardly past opposite ends of the front seat to the rear compartment of the automobile.

Another object is to provide a valve to substantially cut off the discharge of heated air from the open outlets in the casing and simultaneously to divert such heated air to the supply conduits for the defrosters for the windshield.

Another object is to provide a heater structure wherein the bottom of the casing for the hot water core is closed but may be provided intermediate the main outlets at opposite ends thereof with one or more restricted slots or openings through which heated air in restricted quantities may be discharged toward one or more occupants of the front seat of the automobile.

Another object is to provide a heater structure wherein the hot water core aforesaid comprises upper and lower horizontally disposed sections connected together at one end by a short length of tubing, and is located within the casing below a suitable fresh air inlet and above the four outlets mentioned, so that the air from the inlet is thoroughly heated by both sections of the core before being discharged through the outlets.

Another object is to provide a heater structure wherein the valve aforesaid is mounted in such a way within the casing for the hot water core that a restricted amount of heated air from the core is always free to flow through the open outlets into the interior of the vehicle regardless of the position of the valve.

Another object is to provide a heater structure wherein the outlets to the defroster conduits are not only located where they will receive the heated air from the core when the valve aforesaid is in closed position, but are located where they can receive the air that is the hottest after leaving the core.

Another object is to provide a heater structure that is simple in construction, economical to manufacture, easy to install, and efficient in operation.

Other objects, advantages and novel details of construction of this invention will be made more apparent as this description proceeds, especially when considered in connection with the accompanying drawings, wherein:

Fig. 1 is a fragmentary perspective view of a motor vehicle and heater structure embodying our invention applied thereto;

Fig. 2 is a fragmentary vertical sectional view through the dashboard of the vehicle and through the heater structure carried thereby, with parts broken away and in section;

Figure 3:
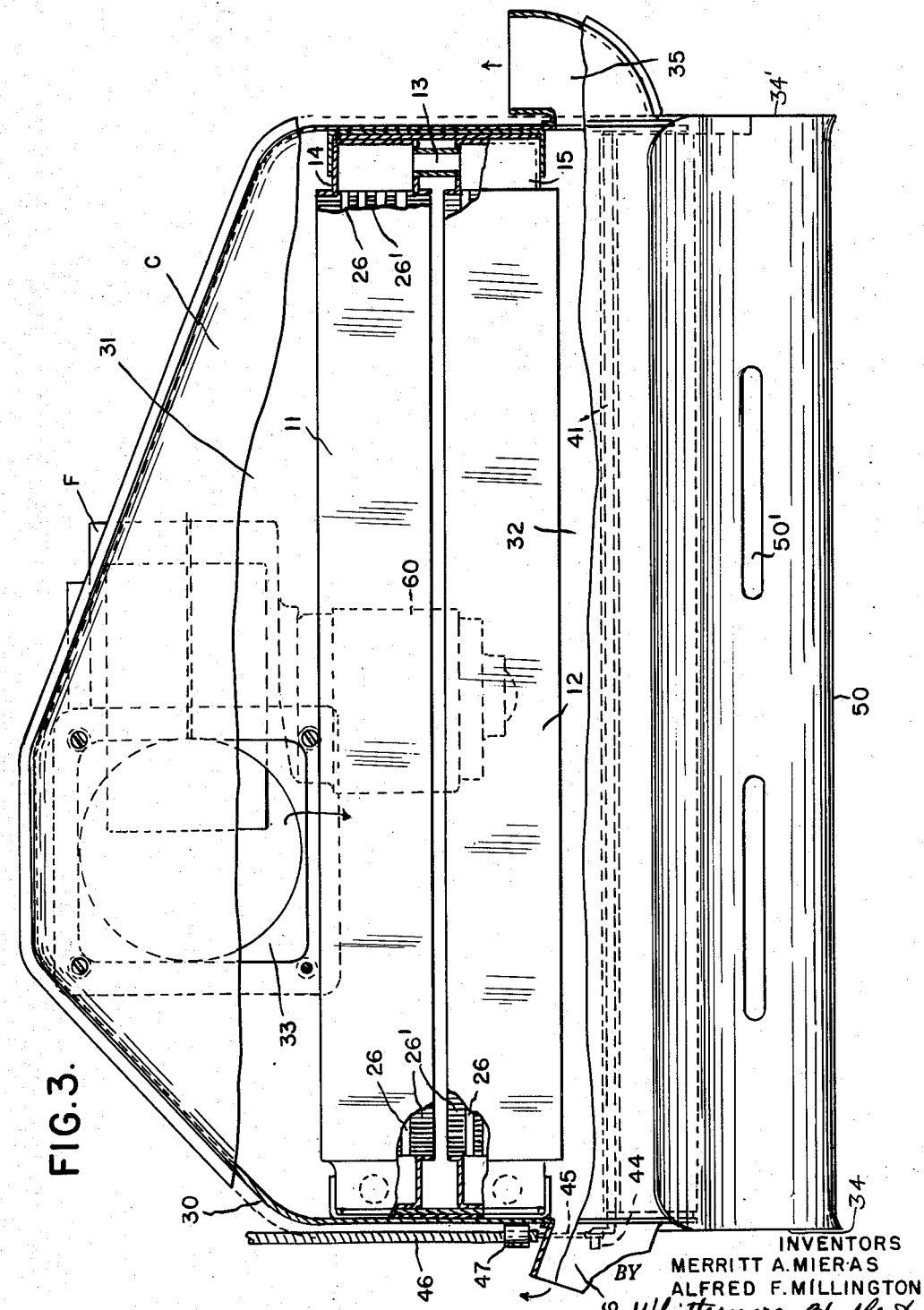
Fig. 3 is an elevational view of the hot water heating unit with parts broken away and in section.
Figure 4:
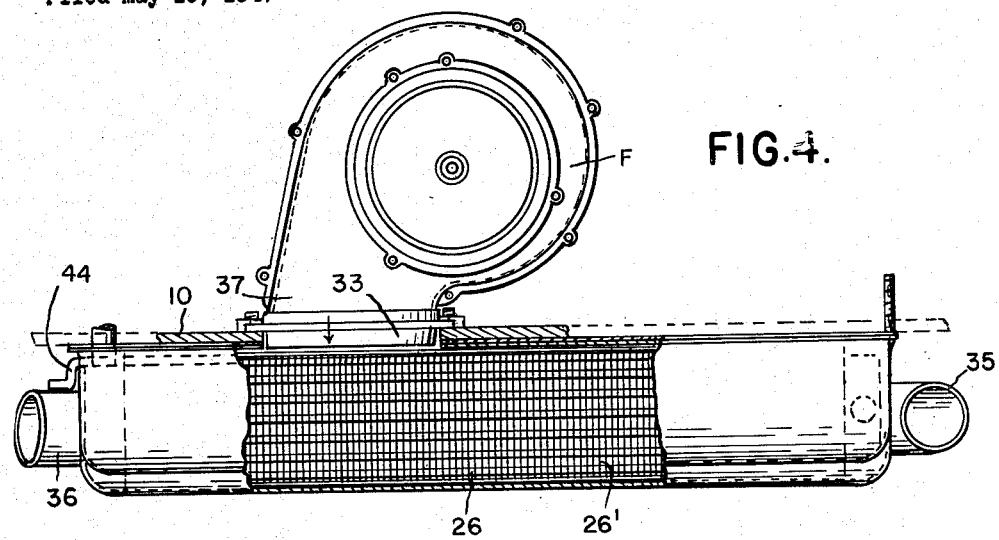
Fig. 4 is a fragmentary horizontal sectional view through the dashboard of the vehicle and showing the blower and hot water heating unit with portions of the latter broken away and in section.

Referring now to the drawings, A is the engine compartment and B is the passenger compartment of a conventional type of automobile.

The heater structure embodying our invention comprises a hot water heating unit C within the passenger compartment, defroster conduits D for the windshield E of the passenger compartment, a sirocco or centrifugal type blower F in the engine compartment and discharging through the dash panel 10 of the passenger compartment to the heating unit C, and a hose or conduit H for conducting air from the atmosphere to said blower F.

As shown, the heating unit C has upper and lower core sections 11 and 12 respectively connected together at one end by a tube 13 and forming a horizontally disposed substantially U- shaped core. Preferably the tube 13 extends between suitable headers 14 and 15 at one end of the sections 11 and 12. A hot water supply tube 16 is connected to a header 17 at the other end of the upper section 11, and a return tube 18 is connected to the header 19 at the other end of the lower section 12. A supply hose 20 extends from the tube 16 to the head 21 of the internal combustion engine so that hot water from said engine will be conducted to the core, while a return hose 22 extends from the tube 18 to the usual connection 23 between the engine and radiator 24 of the vehicle. If desired, a valve 25 may be included in the supply hose 20 adjacent the point where it is connected to the head 21 of the engine to control the flow of hot water from the engine to the core. Thus, in the summertime or during warm weather the valve 25 may be closed to cut off entirely the supply of hot water to the core. As usual, the sections 11 and 12 of the core contain tubing 26 that extends longitudinally of said sections between the headers thereof and such tubing is provided with radiating fins 26'.

In the present instance the core is within a shell or casing 30 that is located upon the back of and is bolted to the dash board 10 of the vehicle. Preferably this casing 30 fits the core rather snugly and is provided above and below the core with chambers 31 and 32 respectively for air. The upper chamber 31 has an inlet 33 for air to be heated by the core, and the lower chamber 32 has four outlets 34, 34', 35 and 36 respectively for heated air from the core. The inlet 33 is intermediate opposite ends of the upper chamber 31 and is supplied with air by a tube 37 extending through the dash from the blower F. The outlets 34 and 34' are located at opposite ends of the chamber 32 and discharge openly into the passenger compartment, while the outlets 35 and 36 are located at opposite ends of the chamber 32 beside the outlets 34 and 34' and discharge into supply conduits D for defrosters D' for the windshield. Preferably the edges of the outlets 34 and 34' are flared at 34'' to provide better diffusion of the heated air.

Figure 5:
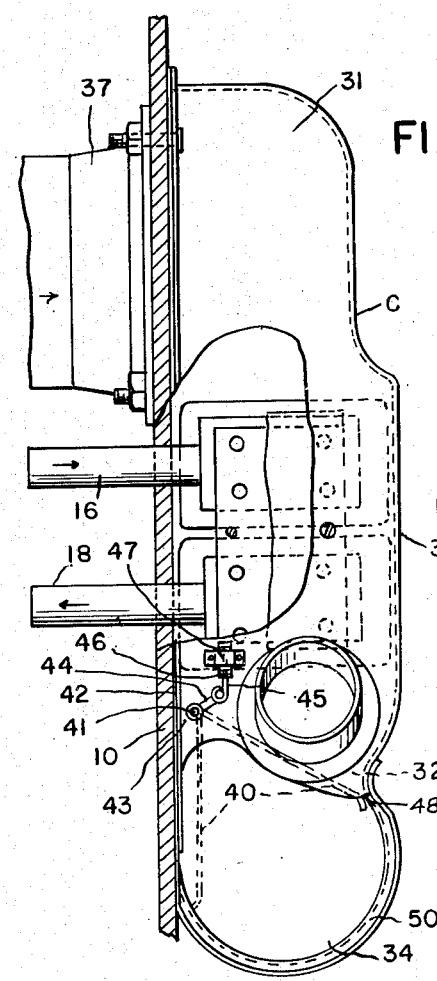
Fig. 5 is a vertical sectional view through the dashboard of the vehicle and showing portions of the heater structure upon opposite sides thereof in elevation with parts broken away.
Figure 6:
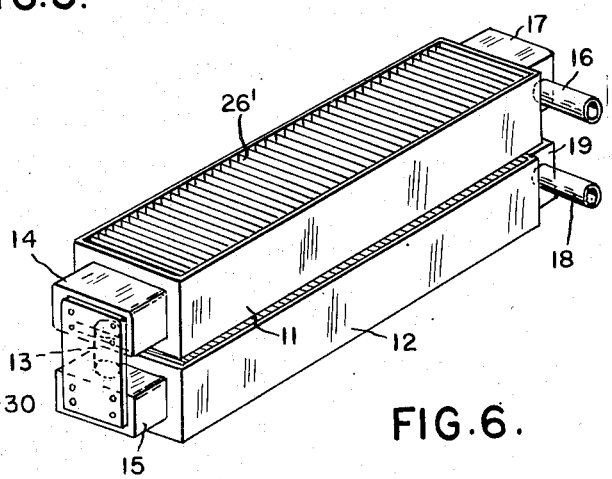
Fig. 6 is a perspective view of the core.

Extending lengthwise of the lower chamber 32 of the casing is a pivotally mounted flapper type valve 40 that is adapted to control the discharge of heated air from the outlets 34, 34', 35 and 36 respectively. Preferably the pivot 41 for the valve 40 is spaced a predetermined distance laterally from and is substantially parallel to the front wall 42 of the casing so that heated air from the core is free to flow downwardly through the restricted space 43 to the outlets 34 and 34' when the valve 40 is in closed position. As shown, this restricted space 43 extends throughout substantially the entire length of the casing. The pivot 41 for the valve is mounted to turn in the end walls of the casing and is provided outside said casing with a crank arm 44 which is adapted to be actuated by a conventional push-pull control wire 45 from the dash or instrument panel of the automobile. Any suitable flexible cable such as 46 clamped at 47 to the casing 30 may be employed as a protecting sleeve for said wire 45. As shown, the valve 40 is movable from an open position substantially parallel to the front wall 42 of the casing to a closed position against an inwardly extending portion 48 of the rear wall of said casing, as shown by dotted lines in Fig. 5. When the valve 40 is in its open position the heated air from the core is free to flow downwardly in front and in rear of the pivot 41 through the outlets 34 and 34' into the passenger compartment of the vehicle, while a small quantity of such heated air will also pass through the outlets 35 and 36 to the defroster conduits D for the windshield. However, when the valve 40 is closed, a small quantity of heated air from the core is free to flow downwardly in the restricted space 43 in front of the pivot 41 and thence through the outlets 34 and 34' to the passenger compartment, while the vast remainder of the heated air from the core will pass through the outlets 35 and 36 to the defroster conduits for the windshield. Thus, the single valve 40 controls the flow of heated air through the four outlets 34, 34', 35 and 36 respectively. By referring to Fig. 2 it will be noted that the bottom of the casing is closed by a channel strip 50 that straddles and is spot welded to opposite sides of the lower end portion of the casing. However, if desired, this strip 50 may be provided intermediate its ends with one or more restricted slots or openings 50' through which heated air in restricted quantities may be discharged toward one or more occupants of the front seat of the automobile.

The sirocco or centrifugal blower F may be any suitable design and is operated by an electric motor 60 which is in circuit with the electrical wiring system of the automobile and may be under the control of a suitable electric switch (not shown) which may be conveniently located on the dash or instrument panel of the automobile.

The hose or conduit H for supplying air from the atmosphere to the blower F extends longitudinally of the engine compartment A at one side thereof and is preferably supported by suitable brackets 61 projecting laterally inward from the adjacent upright side panel (not shown) of the engine compartment. Preferably the forward end portion 63 of the hose H extends over and downwardly in front of the radiator 24 of the automobile so as to receive air after it passes through the protecting grille 65 for the radiator. However, if desired, said forward end portion 63 of the hose may extend through the usual closure plate (not shown) between the grille 65 and radiator 24.

Thus, from the foregoing, it will be apparent that the casing for the hot water core is provided at each end thereof with two outlets for the air that has been heated by the core. One outlet at each end openly discharges endwise from the casing into the interior of the vehicle, while the other outlet at each end is connected to a supply conduit for a defroster for the windshield. Inasmuch as the heated air is discharged from opposite ends of the casing, the flow or distribution thereof will be initially toward opposite sides of the passenger compartment of the vehicle and thence rearwardly along opposite sides of the vehicle to the rear thereof. Thus the flow of heated air directly toward or against the occupants of the front seat is avoided; cold air drafts from the doors are eliminated; and the distribution is generally better. When such heater structure is installed in a two door or four door sedan type of automobile, the heated air discharged from the ends of the casing will also flow rearwardly past opposite ends of the front seat to the rear of the automobile. The valve 40 is operable to substantially cut off the discharge of heated air from the open outlets 34 and 34' and simultaneously to divert such heated air to the supply conduits for the defrosters for the windshield. The valve 40 is also mounted in such a way that a restricted amount of heated air from the core is always free to flow downwardly through the restricted space 43 and thence through the open outlets 34 and 34' into the interior of the vehicle regardless of the position of the valve.

What we claim as our invention is:

1. A heater structure for a motor vehicle, comprising a casing having an inlet for air adjacent the top thereof and having two outlets for air at one end thereof adjacent the bottom thereof, one of said outlets being adapted to discharge endwise from said casing into a passenger compartment of the motor vehicle, a conduit for conducting heated air from the other of said outlets to a windshield of the motor vehicle, means within said casing between said inlet and said outlets for heating air from said inlet, and means within said casing for controlling the discharge of heated air from said outlets, including a pivoted valve extending lengthwise of said casing and engageable with one side wall of the casing to substantially cut off the discharge of heated air through one of said outlets and simultaneously to divert heated air to the other of said outlets, the pivot for said valve being spaced from and substantially parallel to the opposite side wall of said casing so that a restricted space is provided throughout substantially the entire length of the casing through which heated air is always free to pass to said one outlet.

2. A heater structure for a motor vehicle, comprising a casing having an inlet for air adjacent the top thereof and having four outlets for air adjacent the bottom thereof, two of said outlets being located one above the other at one end of said casing, and the other two being located one above the other at the opposite end of said casing, means within said casing between said inlet and said outlets for heating air from said inlet, the lowermost of said outlets being adapted to discharge into the interior of the motor vehicle, means for conducting heated air from the uppermost of said outlets to a windshield of the vehicle, and a pivotally mounted flapper type valve extending lengthwise of said casing and engageable with one side wall of the casing to substantially cut off the discharge of heated air from the lowermost of said outlets and simultaneously to divert heated air through the uppermost of said outlets, the pivot for said valve being at one edge thereof and spaced from and substantially parallel to the opposite side wall of said casing whereby a restricted space is provided throughout substantially the entire length of the casing through which heated air is free to pass continuously to the lowermost of said outlets.

3. A heater structure for a motor vehicle, comprising a casing having an inlet for air adjacent the top thereof and having four outlets for air adjacent the bottom thereof, two of said outlets being located one above the other at one end of said casing, and the other two being located one above the other at the opposite end of said casing, the lowermost of said outlets being adapted to discharge directly into the interior of a motor vehicle, means for conducting heated air from the uppermost of said outlets to a windshield of the vehicle, means within said casing between said inlet and said outlets for heating air from said inlet, and a pivotally mounted flapper type valve extending lengthwise of said casing and operable in one position to substantially cut off the discharge of heated air through the lowermost of said outlets and simultaneously to divert heated air through the uppermost of said outlets.

4. A heater structure for a motor vehicle, comprising a casing having an inlet for air adjacent the top thereof and having adjacent the bottom thereof an outlet through which air may be discharged into a passenger compartment of said vehicle, said outlet being at one end of and discharging endwise from said casing, a hot water core within said casing between said inlet and outlet for heating air from said inlet, said casing having two other outlets through which heated air is discharged to defroster conduits for a windshield for said vehicle, and means within said casing for controlling the discharge of heated air from the three outlets aforesaid, including a single pivotally mounted valve movable to a position to substantially cut off the discharge of heated air through the first mentioned outlet and operable in said position to divert heated air to the last mentioned two outlets.

5. A heater structure for a motor vehicle, comprising a casing having an inlet for air adjacent the top thereof and having adjacent the bottom thereof an outlet through which air may be discharged into a passenger compartment of said vehicle, said outlet being at one end of and discharging endwise from said casing, a hot water core within said casing between said inlet and outlet for heating air received from said inlet, said casing also having two other outlets through which heated air is discharged to defroster conduits for a windshield for said vehicle, and means within said casing for controlling the discharge of heated air from the three outlets aforesaid, including a single pivotally mounted valve extending lengthwise of said casing and movable to a position to substantially cut off the discharge of heated air through the first mentioned outlet and operable in said position to divert heated air through the last mentioned two outlets, the pivot for said valve being spaced from and substantially parallel to a side wall of said casing so that a restricted space is constantly provided between said wall and said pivot throughout substantially the entire length of said casing through which heated air is always free to pass to said first mentioned outlet.

6. A heater structure for a motor vehicle, comprising a hot water core, a casing for said core provided above and below the same with chambers for air, the upper chamber having an inlet for air to be heated by said core, opposite ends of the lower chamber having outlets for air heated by said core and discharging endwise toward opposite sides of a passenger compartment, one outlet at each end, and means controlling the discharge of heated air from said outlets, consisting of a single pivoted valve extending lengthwise of said lower chamber and engageable with one side wall of said lower chamber to substantially cut off the discharge of heated air from said outlets, the pivot for said valve being spaced from and substantially parallel to the opposite side wall of said lower chamber to provide a restricted space extending throughout substantially the entire length of said lower chamber through which heated air is free to pass constantly to said outlets.

7. A heater structure for a motor vehicle, comprising a hot water core, a casing enclosing said core and provided above and below the same with chambers for air, the upper chamber having an inlet for air to be heated by said core, the lower chamber having four outlets for air heated by said core, two of said outlets being in and discharging endwise from opposed end walls of said lower chamber to supply heated air toward opposite sides of a passenger compartment of the motor vehicle, the other two outlets being in said opposed end walls beside the first two outlets, means for conducting heated air from said other two outlets to a windshield of the motor vehicle, and a single pivoted valve extending lengthwise of said lower chamber and engageable with one side wall of said lower chamber to substantially cut off the discharge of heated air from said first mentioned two outlets and simultaneously to divert heated air to said other two outlets, the pivot for said valve being spaced from and substantially parallel to the opposite side wall of said lower chamber to provide a restricted space extending throughout substantially the entire length of said lower chamber through which heated air is free to pass constantly to said first mentioned two outlets.

8. A heater structure for a motor vehicle, comprising a hot water core, a casing enclosing said core and providing above and below the same with chambers for air, the upper chamber having an inlet for air to be heated by said core, the lower chamber having four outlets for air heated by said core, two of said outlets being in opposed end walls of said lower chamber to supply heated air to the interior of a passenger compartment of the motor vehicle, the other two outlets being in said opposed end walls above the first two outlets and adapted to be connected to windshield defroster conduits, and a single pivoted valve extending lengthwise of said lower chamber adjacent one side wall thereof and engageable with the opposite side wall of said lower chamber to substantially cut off the discharge of heated air from said first mentioned two outlets and simultaneously to divert heated air to said other two outlets.

9. A heater structure for a motor vehicle, comprising an elongated casing having an inlet for air adjacent the top thereof and having two outlets for air adjacent the bottom thereof, said two outlets being located one above the other at one end of said casing, the lowermost of said outlets being adapted to discharge into a passenger compartment of the motor vehicle, means for conducting heated air from the uppermost of said outlets to a windshield of the motor vehicle, means within said casing between said inlet and said outlets for heating air from said inlet, and means within said casing for controlling the discharge of heated air from said outlets, consisting of a single pivoted substantially flat elongated valve extending lengthwise of said casing, said valve being swingable from one side to the other of said casing and engageable with one side wall of said casing to substantially cut off the discharge of heated air through the lowermost of said outlets and simultaneously to divert heated air to the uppermost of said outlets, said valve being pivoted along an axis parallel to but slightly spaced from the opposite side wall of the casing to provide a small opening throughout substantially the entire length of the casing through which heated air is always free to pass to the lowermost of said outlets regardless of whether said valve is in engagement with said one side wall of the casing.

MERRITT A. MIERAS.
ALFRED F. MILLINGTON.

REFERENCES CITED

The following references are of record in the file of this patent:

UNITED STATES PATENTS

| Number | Name | Date |
|---|---|---|
| 1,907,433 | Modine | May 9, 1933 |
| 1,966,882 | Bucklen | July 17, 1934 |
| 2,257,638 | Moore | Sept. 30, 1941 |
| 2,300,357 | Hans | Oct. 27, 1942 |
| 2,306,796 | Staley | Dec. 29, 1942 |